US008341352B2

(12) United States Patent
Cain, III et al.

(10) Patent No.: US 8,341,352 B2
(45) Date of Patent: Dec. 25, 2012

(54) CHECKPOINTED TAG PREFETCHER

(75) Inventors: Harold Wade Cain, III, Hartsdale, NY (US); Jong-Deok Choi, Seongnam (KR)

(73) Assignee: International Business Machines Corporation, Armonk, NY (US)

( * ) Notice: Subject to any disclaimer, the term of this patent is extended or adjusted under 35 U.S.C. 154(b) by 930 days.

(21) Appl. No.: 11/736,548

(22) Filed: Apr. 17, 2007

(65) Prior Publication Data

US 2008/0263257 A1    Oct. 23, 2008

(51) Int. Cl.
*G06F 12/00* (2006.01)

(52) U.S. Cl. .................. 711/118; 711/130; 711/213

(58) Field of Classification Search .................. 711/118, 711/128, 130, 133, 135, 137, 213; 714/15, 714/17
See application file for complete search history.

(56) References Cited

U.S. PATENT DOCUMENTS

| | | | |
|---|---|---|---|
| 5,319,766 A | | 6/1994 | Thaller et al. |
| 5,828,821 A | * | 10/1998 | Hoshina et al. .................. 714/15 |
| 6,023,746 A | | 2/2000 | Arimilli et al. |
| 6,026,471 A | | 2/2000 | Goodnow |
| 6,047,363 A | | 4/2000 | Lewchuk |
| 6,108,775 A | | 8/2000 | Shiell et al. |
| 6,122,709 A | * | 9/2000 | Wicki et al. .................... 711/118 |
| 6,845,501 B2 | | 1/2005 | Thompson et al. |
| 6,968,476 B2 | * | 11/2005 | Barowski et al. ................ 714/15 |
| 6,981,104 B2 | * | 12/2005 | Prabhu ........................... 711/144 |
| 7,191,319 B1 | | 3/2007 | Dwyer |
| 7,206,903 B1 | * | 4/2007 | Moir et al. ..................... 711/145 |
| 2002/0174303 A1 | * | 11/2002 | Gelman ........................ 711/137 |
| 2005/0138627 A1 | | 6/2005 | Bradford |
| 2007/0239938 A1 | * | 10/2007 | Pong ............................. 711/122 |
| 2007/0283099 A1 | * | 12/2007 | Chaudhry et al. ............. 711/122 |

OTHER PUBLICATIONS

A. Dhodapkar and J.E. Smith, "Managing multi-configuration hardware via dynamic working set analysis," Proceedings of the 29th International Symposium on Computer Architecture (ISCA-29), May 2002.

A. Dhodapkar and J.E. Smith, "Saving and Restoring Implementation Contexts with co-designed Virtual Machines," Workshop on Complexity Effective Design, Jun. 2001.

T. Sherwood, S. Sair and B. Calder, "Phase Tracking and Prediction," Proceedings of the 30th International Symposium on Computer Architecture (ISCA-30), Jun. 2003.

\* cited by examiner

*Primary Examiner* — Tuan Thai
*Assistant Examiner* — Zhou Li
(74) *Attorney, Agent, or Firm* — Michael J. Buchenborner

(57) ABSTRACT

A dual-mode prefetch mechanism for implementing checkpoint tag prefetching includes: a data array for storing data fetched from cache memory; a set of cache tags for identifying the data stored in the data array; a set of checkpoint tags for storing data identification; a cache controller including prefetch logic, the prefetch logic including a checkpoint prefetch controller and a checkpoint prefetch operator.

5 Claims, 5 Drawing Sheets

Cache augmented with a Tag
Checkpoint Prefetcher

Cache with Checkpointed Tag Prefetcher
operation in checkpoint mode

US 8,341,352 B2

CHECKPOINTED TAG PREFETCHER

CROSS-REFERENCE TO RELATED APPLICATIONS

None.

STATEMENT REGARDING FEDERALLY SPONSORED-RESEARCH OR DEVELOPMENT

None.

INCORPORATION BY REFERENCE OF MATERIAL SUBMITTED ON A COMPACT DISC

Not Applicable.

FIELD OF THE INVENTION

The invention disclosed broadly relates to the field of cache memory and more particularly relates to the field of tag prefetching of cache memory.

BACKGROUND OF THE INVENTION

Main memory access speed has not increased as fast as the clock speeds of modern microprocessors. As a result, the latency of memory access in terms of processor clock cycles has increased over time. These long latencies result in performance degradation when a processor must access main memory. Computer architects have mitigated this problem through the introduction of one or more caches associated with each processor, such as Level 2 cache, built using SRAM memories whose access latencies are much lower than the latencies of main memory. Caches are small images of a portion of main memory. These caches store the data most recently touched by a processor, and when a processor touches (reads/writes/updates) this data again, its performance is improved by avoiding main memory access stalls. Cache access is much faster than main memory access, therefore cache access should be maximized. However, cache is more expensive than main memory, consequently it has less capacity than main memory. The problem becomes how best to maximize cache utilization while working within a small space.

Referring now in specific detail to the drawings, and particularly FIG. 1, there is illustrated a conventional cache implementation 100. Hardware caches, as they are conventionally built by various computer manufacturers, consist of a data array 130 containing the data stored in the cache, a tag array 120 containing meta-data that identifies the set of data currently residing in the data array, and attributes for each data item (e.g. least recently used "LRU" state, coherence permissions), a decoder 140 which is used to map an address to the set of the cache that may contain that address, and a cache controller 110, which is a finite-state machine that controls the refilling of the cache as a response to processor requests that miss in the cache.

Referring to FIG. 2 there is shown a flow chart of the typical flow of a single request performed by the processor, according to the known art. The process begins at step 210 with the processor initiating a request by driving a request address in conjunction with a request signal to the cache's decoder 140. In step 220 the cache decoder 140 determines the set number to which this address corresponds, and drives a signal to that set. In step 230 this signal activates the tag-match logic corresponding to that particular set, which compares the remaining bits of the processor's address to the current contents of that set.

In step 240 in the event of a cache miss, the processing proceeds to step 270 where the cache hit signal is held to zero, and a cache refill is initiated by the cache controller. If, however, there is a cache hit, then in step 250 the cache hit signal is asserted, and a signal is sent to the data array for that cache block. Next, in step 260 the data from the data array is read and sent to the requesting processor. In most cache implementations, the tag metadata contains the upper-order bits of each cache block's physical address.

The drawback with these caches is that their capacity is small relative to the size of main memory; consequently, their contents must be carefully managed to maximize the probability that a processor's future memory accesses will be available from the cache. Rather than simply retaining the most recently touched data, many processors implement prefetching mechanisms that predict those memory locations that a processor will reference in the future, and preload this data into the cache in preparation for the processor's upcoming demands. These prefetching mechanisms can be categorized as software prefetchers or hardware prefetchers.

Software prefetching is supported by the processor through one or more special prefetch instructions that are inserted into a program's instruction sequence by a programmer, compiler, or run-time system, based on some knowledge of the application's future memory reference pattern. A prefetch instruction causes the processor to preload a memory location into the processor's cache, without stalling the processor while it is being loaded. Unlike software prefetching, hardware prefetchers operate independently of any software control. By monitoring either the pattern of memory accesses being performed by a processor, or the pattern of cache miss requests from a cache, these prefetchers can predict a processor's future memory access pattern, and preload this data without any support from the programmer, compiler, or run-time system.

In many scenarios, the benefits of known hardware and software prefetchers are limited, because a program's reference pattern may be difficult to determine or summarize in a manner amenable to either hardware or software. Also, an application's recent memory reference history may not be indicative of its future memory reference pattern. For example, many applications exhibit phase behavior, in which the application's working set of memory locations and memory access patterns are consistent within one phase of time, however may vary wildly across different phases. These phases may also be periodic, following a predictable sequence of phases (e.g. ABCABCABC, where each letter represents a distinct phase of execution). When phases change, the hardware prefetcher may not remember the reference pattern that occurred during a previous execution of the new phase, and must incur a training period during which its effectiveness is limited.

Therefore, there is a need for a prefetch mechanism to overcome the stated shortcomings of the known art.

SUMMARY OF THE INVENTION

Briefly, according to an embodiment of the invention a dual-mode prefetching method using checkpoint tags, includes the following steps or acts when in normal mode: fetching a cache block from cache memory; writing data from the cache block into a data array; writing an address and metadata of the data into an array of cache tags; and writing an at least one identifier of the data into at least one array of checkpoint tags, wherein the at least one array of checkpoint tags is located in a prefetch mechanism.

The method may optionally include steps of receiving a checkpoint request; and switching from normal mode to checkpoint mode. Additionally, the method may include a step of storing a thread-id of a currently-running software application into the at least one array of checkpoint tags.

According to an embodiment of the present invention, a prefetching method in checkpoint mode includes steps or acts of: receiving a save request; fetching at least one cache block from cache memory; writing data from the at least one cache block into a data array; and writing an address and metadata of the data into an array of cache memory tags, the cache memory tags referencing locations of data in the data array. The method continues with receiving a restore request; fetching an identifier for the at least one cache block in at least one checkpoint tag array; reloading the cache memory with the at least one cache block referenced by its identifier in the at least one checkpoint tag array that is not already stored in the cache memory; and switching to normal mode.

A dual-mode prefetch mechanism for implementing checkpoint tag prefetching includes: a data array for storing data fetched from cache memory; a set of cache tags for identifying the data stored in the data array; at least one set of checkpoint tags for storing data identification; a cache controller including prefetch logic, the prefetch logic including a checkpoint prefetch controller and a checkpoint prefetch operator.

The method can also be implemented as machine executable instructions executed by a programmable information processing system or as hard coded logic in a specialized computing apparatus such as an application-specific integrated circuit (ASIC).

BRIEF DESCRIPTION OF THE DRAWINGS

To describe the foregoing and other exemplary purposes, aspects, and advantages, we use the following detailed description of an exemplary embodiment of the invention with reference to the drawings, in which.

Figure 1:
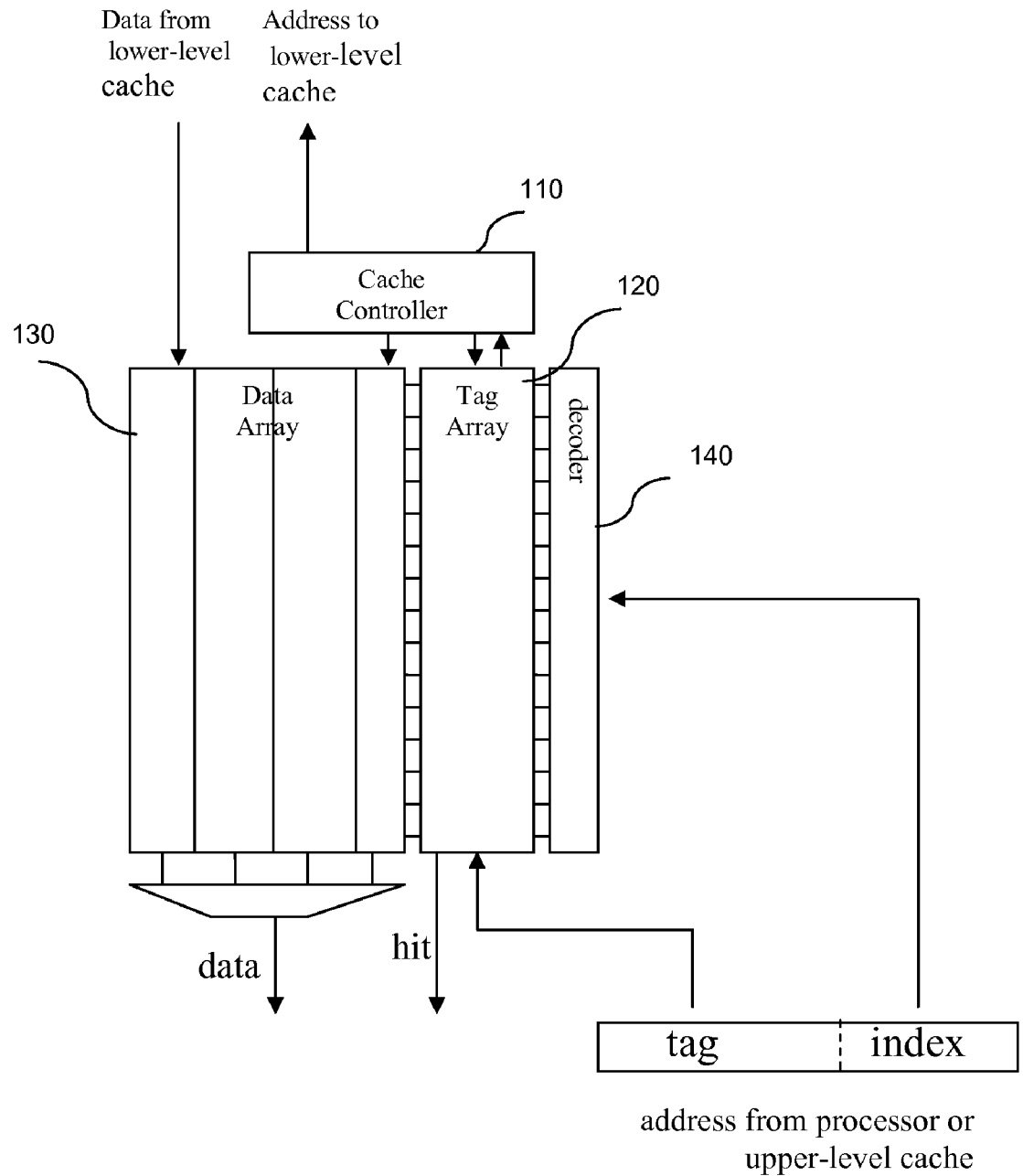
FIG. 1 depicts a conventional cache implementation, according to the known art.
Figure 2:
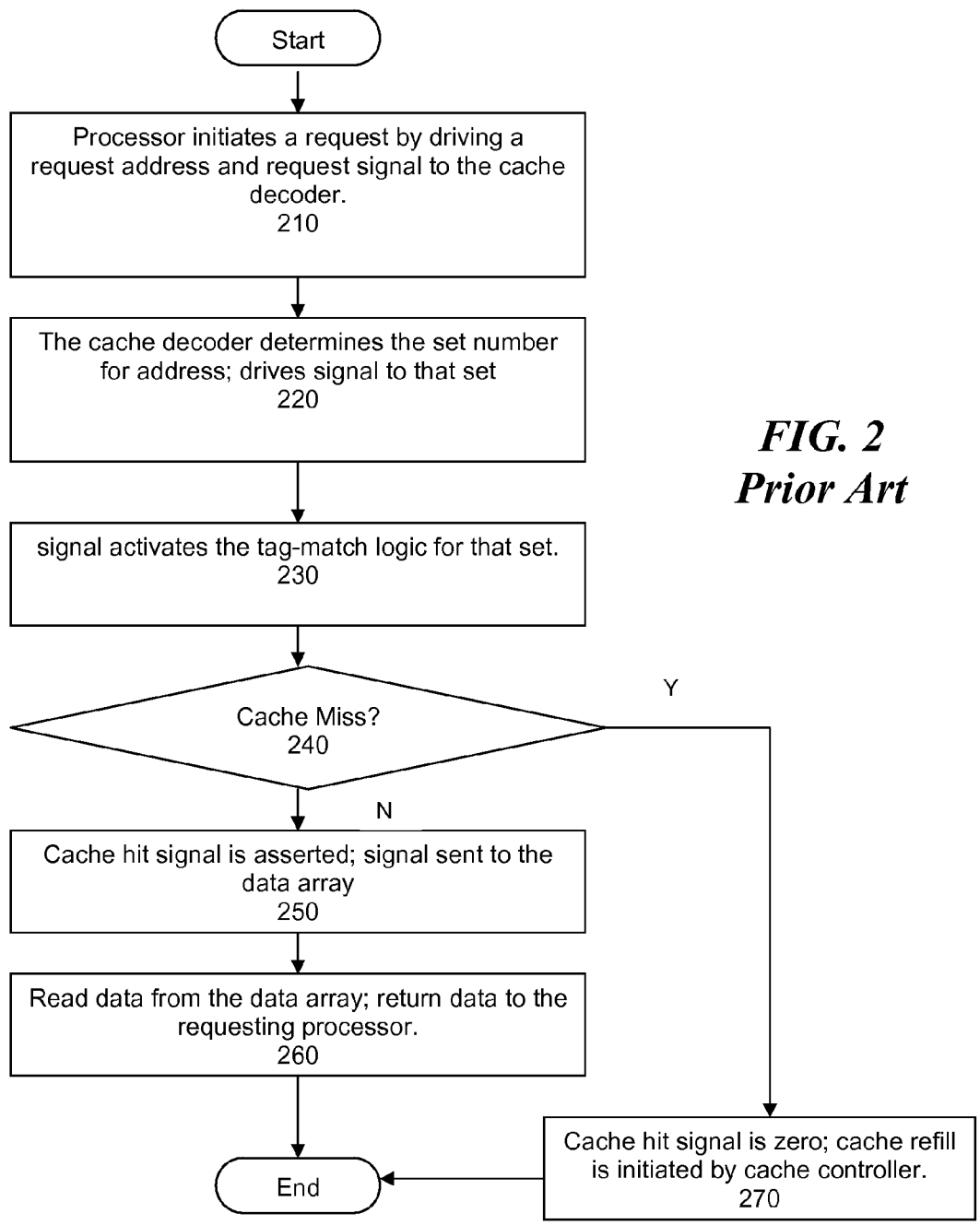
FIG. 2 is a flow chart of the typical flow of a single request in a conventional cache implementation, according to the known art.

While the invention as claimed can be modified into alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the scope of the present invention.

DETAILED DESCRIPTION

We describe a prefetching mechanism based on cache tag checkpointing, useful for reducing cache misses in instruction, data, and unified caches. Cache tags (sometimes also known as "directories") are a portion of the cache memory that labels the contents of the data stored in the cache, so that the contents of the cache may be easily determined. Although very small relative to the overall cache size, the tags can be used to reconstruct the contents of the entire cache. As used in this specification, a checkpoint is a point at which information about the status of a job and/or the system state can be recorded so that the job step can later be restarted in its checkpointed state.

The checkpoint prefetching mechanism described herein is based on the observation that there are many events that will temporarily touch large amounts of data, displacing the application's regular working set. These events are visible by both hardware and software. Examples of such events include garbage collection, system calls, context switches, searches or manipulations of large data structures, and so on. After the completion of the event, it is desirable to return the cache to its state prior to the event's occurrence (execute a Restore operation). By checkpointing (executing a Record operation) the cache's tags at the event's initiation, a prefetching mechanism can restore the cache contents at the event's completion using the cache tags as a reference point. This in turn reduces the number of cache misses caused by the displacement of the application's working set during the event occurrence.

Figure 3:
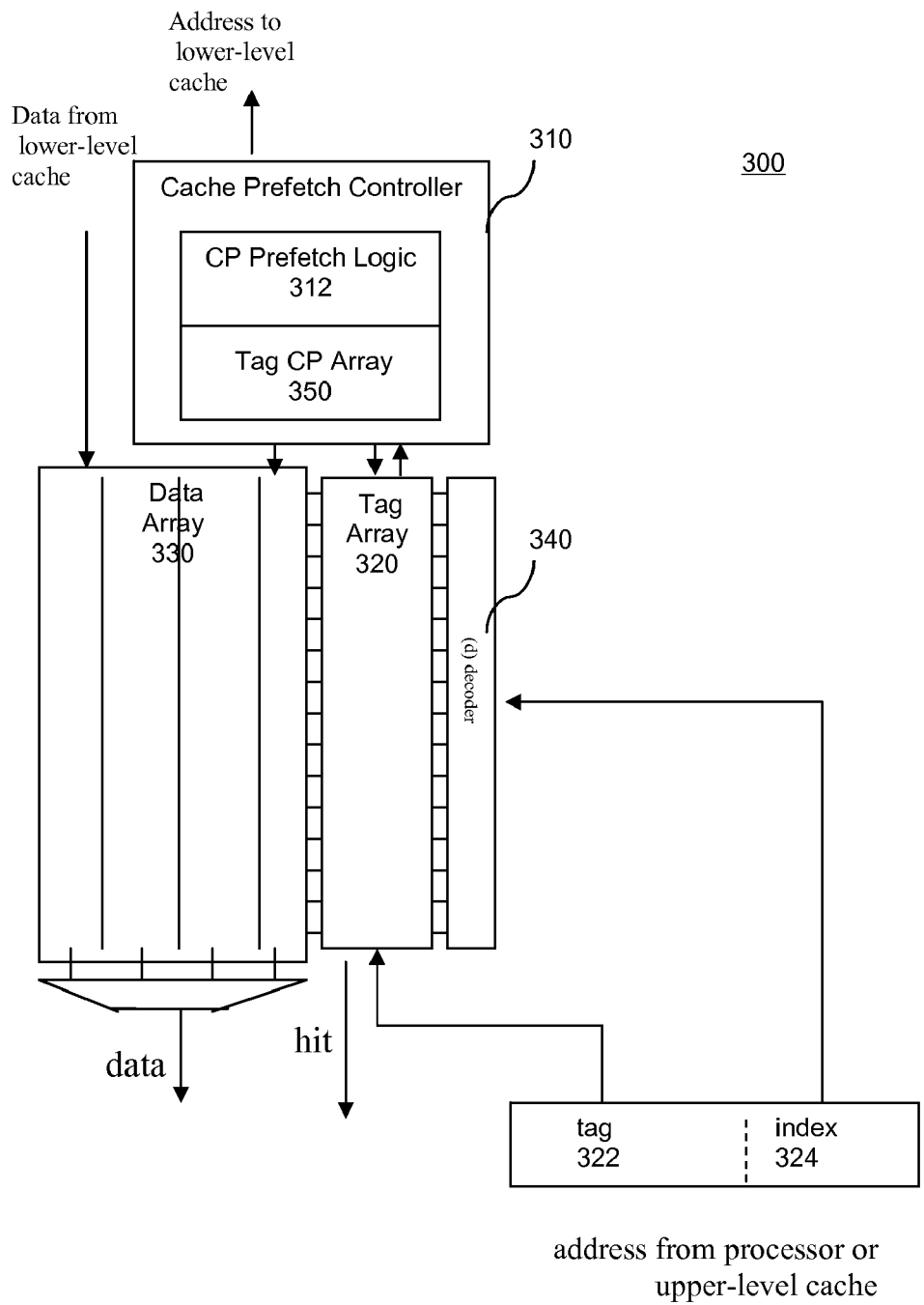
FIG. 3 depicts a cache mechanism utilizing a checkpointed tag prefetcher, according to an embodiment of the present invention.

FIG. 3 illustrates a hardware cache implementation which has been augmented with logic to implement a checkpointed-tag prefetcher. A hardware cache with checkpointed-tag prefetcher contains one or more duplicate set of cache tags 350, and a cache controller 310 that has been augmented with checkpointed-tag prefetching logic 312. The cache controller 310 according to an embodiment of the present invention includes the following two components: the checkpoint prefetcher (CP) operator of the checkpoint prefetching mechanism 300, and the CP controller needed to recognize event initiation/completion and control the CP operator. Note that these two components may be implemented as hardware, firmware, or software.

This cache mechanism 300 operates in one of two modes: normal mode or checkpointed mode. During normal operation, for each cache miss the checkpointed tag array 350 is written with the virtual tag address, while the conventional tag array 320 is written with the physical address (or virtually address in a virtually-tagged cache). Consequently, at any point in time during normal operation, the checkpointed tag array 350 summarizes the contents of the cache using virtual addresses.

When operating in checkpointed mode, the checkpoint tag array 350 is frozen, and subsequent updates to the cache are not reflected in the checkpoint tag array 350 in order to maintain the checkpoint tag array 350 in the state it was in at the initiation of the checkpoint request.

Figure 4:
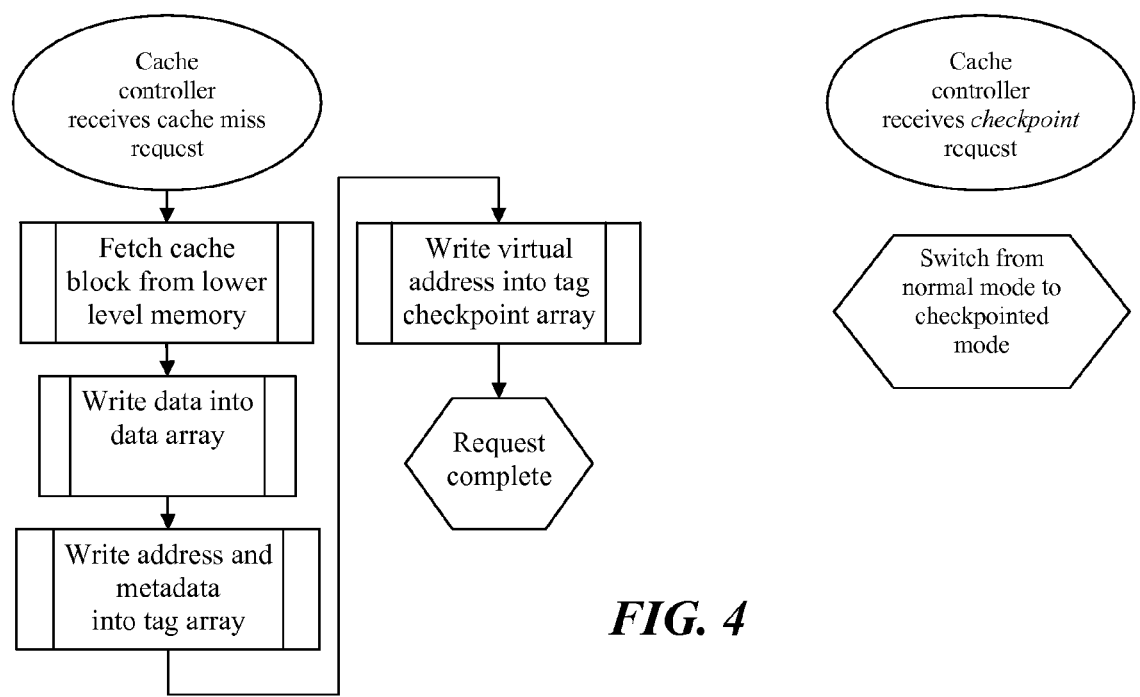
FIG. 4 is a flow chart of the checkpointed tag prefetcher when operating in normal mode, according to an embodiment of the present invention.
Figure 5:
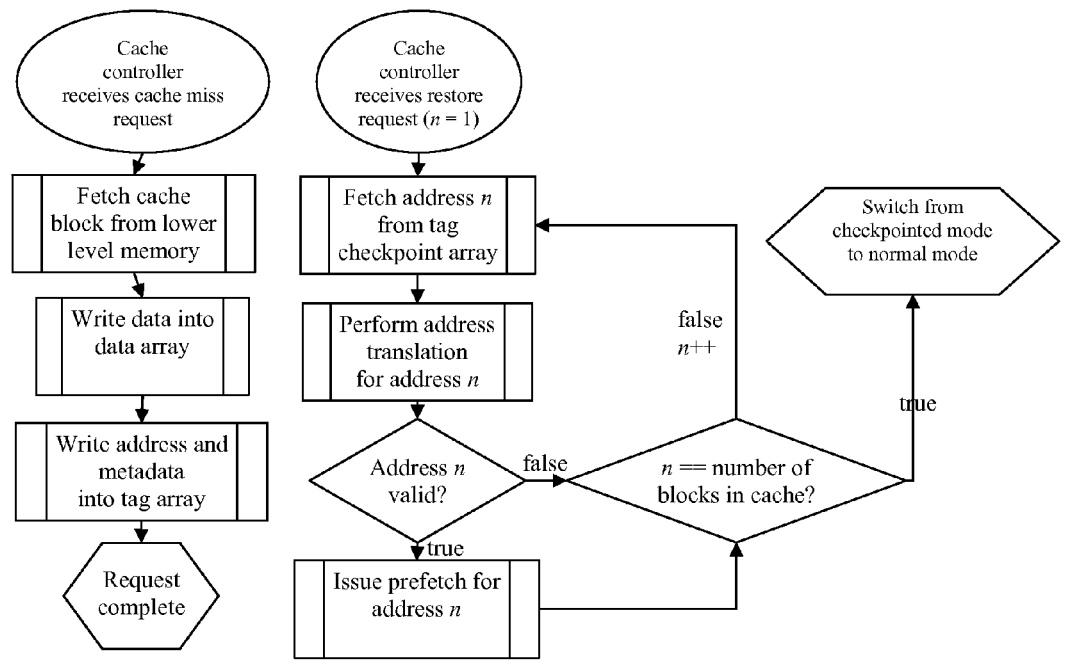
FIG. 5 is a flow chart of the checkpointed tag prefetcher when operating in checkpointed mode, according to an embodiment of the present invention.

In addition to the usual functions performed by the cache controller 310, this controller 310, with its augmented logic 312, will also respond to checkpoint and restore requests, as described in FIGS. 4 and 5. The decoder 340 provides a mapping between the identifiers kept in the checkpoint tag array 350 and the data arrays 330, just as it does with the regular tag array 320. Note that the identifiers could take the form of a virtual address. The decoder 340 would map or translate the virtual address to a physical address.

Checkpoint Prefetcher Operation.

Referring again to FIG. 3, in its simplest embodiment, the Checkpoint Prefetcher mechanism 300 contains CP prefetch logic 312 and a single set of duplicate cache tags 350. Other embodiments may contain additional sets of tags. When operating in normal mode, at the initiation of a potentially cache-thrashing event, the CP controller 310 initiates a "save" operation (a Record operation). The save operation entails copying the current cache tags 320 into the duplicate copy 350. Note that any updates made to the cache 330 will not be reflected in this duplicate copy 350 while the mechanism 300 is in Checkpoint mode. Updates to the tag checkpoint may be made in a lazy manner.

At the termination of a cache thrashing event, the CP controller 310 initiates a "restore" operation. During a restore operation, the CP controller 310 issues a sequence of commands reloading the cache 330 with any cache blocks referenced in the duplicate tags 350 but absent from the cache 330. Because such operations are simple hints for performance improvement, they can be performed asynchronously, in the background, while the processor continues to execute instructions and use the cache 330. In this simple form, the checkpoint prefetcher 300 may restore the cache contents across a single cache-thrashing/displacement event.

In another embodiment, a set of several cache tag checkpoints may be saved, allowing the cache state to be saved and restored across multiple cache displacing events. For example, it would be necessary to save the cache state across context switches when more than two software threads share a processor, or a single thread exhibits recurring phases of execution involving more than two distinct phases.

In another embodiment, the Prefetcher 300 may contain a single set of duplicate tags with a memory-mapped interface by which software can read from or write to the duplicate tag memory. Software could use this interface to save an arbitrary number of tag checkpoints. As in the previous embodiment, a save operation will copy the current tag state to a duplicate set of tags. Afterwards, through memory-mapped reads, software can copy the duplicate tag memory to a buffer where it will reside until the cache contents should be restored from this checkpoint.

The restoration process involves reloading the duplicate tag memory from this buffer using memory-mapped writes, followed by the restore operation that will cause the prefetcher logic to reload the cache's contents based on the contents of the duplicate tag checkpoint memory. Through the addition of this memory-mapped checkpoint interface, the number of checkpoints that software may be able to reuse is unbounded. In addition to supporting an arbitrary number of contexts in a multi-programmed operating system or an arbitrary number of application phases, this interface would also be useful when performing process migration in a multiprocessor system.

Save/Restore Initiation and Thrashing Event Recognition.

Save and restore operations may be software-initiated or hardware-initiated. In a software-initiated implementation, the processor would include an interface by which programmers can initiate saves and restores of cache checkpoints, at any point that the programmer believes checkpoint prefetching may benefit. In a hardware-based implementation, logic embedded in the processor would initiate cache checkpoint saves and restores based on events that are visible within the processor, such as exception handling and phase detection. For example, at the occurrence of an exception, a checkpoint may be made of the current cache state. Upon return from the exception handler (occurrence of an rfi (return from interrupt) instruction in PowerPC) a restore operation would be initiated. Phase changes can be detected using simple monitoring hardware and signatures constructed uniquely representing each phase. [see A. Dhodapkar and J. E. Smith, "Managing multi-configuration hardware via dynamic working set analysis," *Proceedings of the 29th International Symposium on Computer Architecture* (*ISCA*-29), May 2002, and T. Sherwood, S. Sair, and B. Calder, "Phase Tracking and Prediction," *Proceedings of the 30th International Symposium on Computer Architecture* (*ISCA*-30), June 2003].

Accordingly, a hardware-initiated checkpoint prefetcher could perform saves at the detection of phase changes and restores at the reversion to a previously detected phase. Although a software-based implementation should also be able to capture this behavior, in circumstances where software modification is not possible a hardware-initiated prefetcher can reap some of the benefits of checkpoint prefetching. A hybrid implementation may also be beneficial, which would allow a programmer to initiate saves and restores in software, but would revert to a predictive hardware-based initiation in the absence of programmer directives.

Cache Tag Prefetcher in Normal Mode.

When operating in normal mode, cache miss requests behave as in a conventional cache, however the virtual address of the request is also written to the tag checkpoint array. Referring to FIG. 4 there is shown a flow chart of the cache management mechanism operating in normal mode, according to an embodiment of the present invention. The process begins in step 410 when the cache controller 310 receives a cache miss request or any other indication of a potential cache-thrashing event. In step 420 the controller 310 fetches a cache block from lower level memory. In step 430 the controller 310 writes data into the data array 330. Next in step 440 the address of the data and its metadata is written into the tag array 320. In the next step, 450, the process diverges from conventional mechanisms. The controller 310 writes the virtual address into the tag checkpoint array 350. The checkpointed tag array 350 is written with the virtual tag address, while the conventional tag array is written with the physical address (or virtual address in a virtually-tagged cache). Consequently, at any point in time during normal operation, the checkpointed tag array 350 summarizes the contents of the cache using the virtual addresses of the data blocks. In step 490 the process is complete.

In response to a checkpoint request, in step 460 the cache controller 310 simply transitions from normal mode to checkpointed mode. Restore requests performed during normal mode are ignored by the cache controller 310.

When operating in checkpoint mode, requests that result in a cache miss will be serviced by the cache controller as in normal mode, however, no address will be written to the checkpointed tag array 350. In response to a restore request, the cache controller 310 sequentially reads each address contained in the tag checkpoint array 350. For each of these addresses, address translation is performed by the decoder 340, and if the address is valid, the cache is referenced and a cache miss request is serviced if this reference results in a cache miss. Prefetches can be filtered by maintaining a thread-id as part of the tag-checkpoint array 350 in order to prevent cache pollution due to restoration of irrelevant cache data. If the thread-id of a tag checkpoint array entry is not equivalent to the currently running software thread-id, the prefetch is ignored. In this manner addresses that do not pertain to the running thread (i.e. if they were brought into the cache by a different software thread) will be filtered. Likewise, if address translation is not successful, the request is ignored and the next data block is processed.

FIG. 5 shows a flow chart of the cache management mechanism 300 operating in checkpoint mode, according to an embodiment of the present invention. The process begins at step 510 when the cache controller 310 receives a cache miss request. In step 520 the controller 310 fetches a cache block from lower level memory and in step 530 writes data into the data array 330. Additionally, in step 540 the controller 310 writes the address and metadata into the tag array 320. Processing is complete in step 590.

If the cache controller 310 receives a restore request in step 550 for address n=1, it fetches the address n from the tag checkpoint array 350 in step 555. Next it performs address translation for address n in step 560. If address n is valid in step 565, the controller 310 issues a prefetch for address n in step 570. Address invalidity may indicate unmatched thread-ids or an address referencing a data block that is in cache memory. Note that the checkpoint tag array 350 was frozen during the time the mechanism 300 is in checkpoint mode. Therefore, any updates to cache memory which might have occurred during this time period should not be overwritten by cache memory which was "frozen."

If n equals to the number of blocks in cache memory in step 575, then the restore request is complete and the controller 310 switches from checkpointed mode back to normal mode in step 580. Else, if n is less than the total number of blocks in cache memory, the processing returns to step 555 wherein the controller 310 sequentially reads each address contained in the tag checkpoint array 350 and continues until all of n blocks have been restored. Note that in checkpoint mode, no address will be written to the checkpointed tag array 350 in case of a cache miss. In step 565 if address translation is not successful, then in step 575 this block is skipped and processing continues.

Checkpoint and restore operations may be initiated by either software or hardware. When initiated by software, both the checkpoint and the restore requests are non-blocking; meaning that the processor initiating the requests may proceed with instruction processing immediately, without waiting for the checkpoint or restore operation to complete. Software may initiate a checkpoint or restore operation using special instructions or memory-mapped reads/writes.

A hybrid implementation may also be beneficial, which would allow a programmer to initiate saves and restores in software, but would revert to a predictive hardware-based initiation in the absence of programmer directives.

What has been shown and discussed is a highly-simplified depiction of a programmable computer apparatus. Those skilled in the art will appreciate that a variety of alternatives are possible for the individual elements, and their arrangement, described above, while still falling within the scope of the invention. Thus, while it is important to note that the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of signal bearing media include ROMs, DVD-ROMs, and transmission-type media, such as digital and analog communication links, wired or wireless communications links using transmission forms, such as, for example, radio frequency and light wave transmissions. The signal bearing media make take the form of coded formats that are decoded for use in a particular data processing system.

Therefore, while there has been described what is presently considered to be the preferred embodiment, it will understood by those skilled in the art that other modifications can be made within the spirit of the invention. The above descriptions of embodiments are not intended to be exhaustive or limiting in scope. The embodiments, as described, were chosen in order to explain the principles of the invention, show its practical application, and enable those with ordinary skill in the art to understand how to make and use the invention. It should be understood that the invention is not limited to the embodiments described above, but rather should be interpreted within the full meaning and scope of the appended claims.

We claim:

1. A cache management method using checkpoint tags, the method comprising steps of:
   in a cache mechanism comprising a data array storing data fetched from cache memory, a cache tag array identifying data stored in said data array, and a checkpoint tag array storing virtual addresses and data identification, using a cache controller to perform steps of:
   receiving a cache miss request for data from a processor;
   fetching a cache block comprising the data from a cache memory;
   writing the data from the cache block into the data array;
   writing a physical address and metadata of the cache block into the cache tag array;
   checkpointing a current state of the cache tags, by writing a virtual address of the cache block into the checkpoint tag array such that at any point in time said checkpointed tag array summarizes contents of each cache block using its virtual address;
   wherein a cache tag is a portion of the cache memory that labels contents of the data stored in the cache; and
   using the checkpoint tag array to restore the cache memory at a subsequent time, using the cache tags as a reference point for prefetching the cache block.

2. The method of claim 1 further comprising steps of:
   receiving a checkpoint request; and
   switching from normal mode to checkpoint mode responsive to receiving the checkpoint request.

3. The method of claim 1 wherein the step of writing an address and metadata of the data into the cache tag array comprises writing a physical address.

4. The method of claim 1 further comprising a step of:
   storing a thread-id of a currently running software application into the checkpoint tag array.

5. The method of claim 1 wherein the checkpoint tag array is explicitly read and written by software.

* * * * *